United States Patent
Baker

(10) Patent No.: US 10,108,020 B2
(45) Date of Patent: Oct. 23, 2018

(54) VISUAL DISPLAY SYSTEM FOR A HIGH-GAIN REFLECTIVE BEAM-SPLITTER

(71) Applicant: NB TECH INC., Conway, AR (US)

(72) Inventor: Gary Baker, Conway, AR (US)

(73) Assignee: NB TECH INC., Conway, AR (US)

( * ) Notice: Subject to any disclaimer, the term of this patent is extended or adjusted under 35 U.S.C. 154(b) by 321 days.

(21) Appl. No.: 14/940,750

(22) Filed: Nov. 13, 2015

(65) Prior Publication Data

US 2016/0103329 A1    Apr. 14, 2016

Related U.S. Application Data

(62) Division of application No. 13/559,828, filed on Jul. 27, 2012, now Pat. No. 9,211,481.

(51) Int. Cl.
*G03B 21/56* (2006.01)
*G02B 27/10* (2006.01)
(Continued)

(52) U.S. Cl.
CPC .......... *G02B 27/1073* (2013.01); *A47B 37/02* (2013.01); *A47B 87/002* (2013.01);
(Continued)

(58) Field of Classification Search
CPC ....... H04N 5/23293; H04N 2201/0246; G03B 21/145; G02B 6/2706; G02B 27/2292;
(Continued)

(56) References Cited

U.S. PATENT DOCUMENTS

| 3,583,466 A | 6/1971 | Dreyer |
| 4,620,467 A | 11/1986 | Margraf |

(Continued)

FOREIGN PATENT DOCUMENTS

| GB | 565651 A | 4/1948 |
| WO | 2005096095 A1 | 10/2005 |
| WO | 2009134228 A1 | 11/2009 |

OTHER PUBLICATIONS

International Search Report Appln. No. PCT/CN2013/051939; dated Oct. 9, 2013.

(Continued)

*Primary Examiner* — Sarang Afzali
*Assistant Examiner* — Darrell C Ford
(74) *Attorney, Agent, or Firm* — Ladas & Parry LLP; Loren K. Thompson

(57) ABSTRACT

A system and method of making a remarkably bright high-gain reflective beam-splitter is presented. Each non-glued together touching layer of the multilayered film of the beam splitter has front and back reflective surfaces that additively increase the brightness. The system can include tables, step-down shelves, cutting bars, gripper units, tension units, a frame, a hoist assembly, and dollies. Constructing the beam-splitter can use grippers that slip slightly, as a function of applied tensioning force, along the trimmed edges of the multilayered film. This slip gripping scheme can result in constructing substantially coplanar sheets of the multilayered film that touch each other face to face and result in removing most of the air between the sheets. The planar integrity of the multilayered film of the high-gain reflective beam-splitter can be maintained at almost any desired display angle even when the high-gain reflective beam-splitter is as large as a standard theatrical stage.

20 Claims, 14 Drawing Sheets

(51) Int. Cl.

| | | |
|---|---|---|
| *A63J 21/00* | (2006.01) | |
| *G02B 27/14* | (2006.01) | |
| *G02B 27/22* | (2018.01) | |
| *A47B 37/02* | (2006.01) | |
| *A47B 87/00* | (2006.01) | |
| *A63G 31/00* | (2006.01) | |

(52) U.S. Cl.
CPC .............. *A63G 31/00* (2013.01); *A63J 21/00* (2013.01); *G02B 27/142* (2013.01); *G02B 27/144* (2013.01); *G02B 27/2292* (2013.01); *Y10T 29/49826* (2015.01)

(58) Field of Classification Search
CPC .... G02B 27/142; G02B 27/144; G02B 27/02; G02B 27/09; G02B 27/0905; G02B 27/10; G02B 27/1006; G02B 27/106; G02B 27/14; G02B 7/00; G02B 7/003; G02B 7/04; G02B 26/00; G02B 26/04; G02B 26/0808; G02B 26/08; G02B 27/0075; G02B 2027/0109; A63J 21/00; Y10T 29/49826; Y10T 29/49904; Y10T 29/49895; Y10T 29/49901; G09B 13/04
USPC ................... 29/448, 758, 759; 359/443–461, 359/618–641, 583; 348/333.01; 353/119
See application file for complete search history.

(56) References Cited

U.S. PATENT DOCUMENTS

| | | | |
|---|---|---|---|
| 4,818,045 A | 4/1989 | Chang | |
| 4,842,389 A | 6/1989 | Wood et al. | |
| 5,089,903 A | 2/1992 | Kuwayama et al. | |
| 5,291,316 A | 3/1994 | Haberman et al. | |
| 5,313,317 A | 5/1994 | Seburi et al. | |
| 5,445,054 A | 8/1995 | Pryor | |
| 5,809,624 A | 9/1998 | Nakamae et al. | |
| 6,127,067 A | 10/2000 | Ueda et al. | |
| 6,220,713 B1 | 4/2001 | Tadic-Galeb et al. | |
| 6,414,727 B1 | 7/2002 | Benton | |
| 6,728,031 B2* | 4/2004 | Hirata | G03B 17/50 359/457 |
| 6,783,349 B2 | 8/2004 | Neavin et al. | |
| 6,938,844 B2 | 9/2005 | Castronovo | |
| 7,359,118 B2 | 4/2008 | Kiso et al. | |
| 7,675,681 B2 | 3/2010 | Tomikawa et al. | |
| 7,798,652 B2* | 9/2010 | Ikeda | A47F 11/06 353/74 |
| 8,490,271 B2 | 7/2013 | Harvilchuck et al. | |
| 8,899,757 B2 | 12/2014 | Williams, IV | |
| 8,955,977 B2 | 2/2015 | Yamaguchi et al. | |
| 9,810,995 B2* | 11/2017 | Ebihara | G03F 7/70333 |
| 2001/0000678 A1* | 5/2001 | Hattori | G02B 27/1073 353/20 |
| 2001/0021002 A1 | 9/2001 | Kodama et al. | |
| 2001/0028406 A1 | 10/2001 | Tarnoff et al. | |
| 2002/0131027 A1 | 9/2002 | Takezawa et al. | |
| 2002/0140905 A1 | 10/2002 | Ouchi et al. | |
| 2004/0140044 A1 | 7/2004 | Rassi et al. | |
| 2004/0165060 A1* | 8/2004 | McNelley | G02B 27/2292 348/14.08 |
| 2004/0165152 A1 | 8/2004 | Ito et al. | |
| 2004/0223068 A1 | 11/2004 | Kamo | |
| 2005/0016670 A1 | 1/2005 | Kanbara et al. | |
| 2005/0046767 A1 | 3/2005 | Freking et al. | |
| 2005/0078378 A1 | 4/2005 | Geist | |
| 2005/0122591 A1 | 6/2005 | Parker et al. | |
| 2005/0180001 A1 | 8/2005 | Takahashi et al. | |
| 2006/0181607 A1* | 8/2006 | McNelley | G02B 27/2292 348/14.08 |
| 2006/0225827 A1 | 10/2006 | Lei et al. | |
| 2007/0014018 A1 | 1/2007 | Wheatley et al. | |
| 2007/0056482 A1* | 3/2007 | Robinson | A47B 3/06 108/25 |
| 2007/0087132 A1 | 4/2007 | Greener et al. | |
| 2007/0163982 A1* | 7/2007 | Lichinchi | B60P 1/5471 212/175 |
| 2007/0177275 A1 | 8/2007 | McGuire, Jr. | |
| 2007/0201004 A1 | 8/2007 | O'Connell et al. | |
| 2007/0224434 A1 | 9/2007 | Osada et al. | |
| 2007/0258133 A1 | 11/2007 | Bellanca et al. | |
| 2007/0291344 A1* | 12/2007 | Yamauchi | G02B 3/0043 353/38 |
| 2008/0011411 A1 | 1/2008 | Fujita et al. | |
| 2008/0030865 A1* | 2/2008 | Gilbert | G01N 21/6452 359/629 |
| 2008/0286541 A1 | 11/2008 | Zeisler et al. | |
| 2009/0133922 A1 | 5/2009 | Okazaki et al. | |
| 2009/0165841 A1* | 7/2009 | Gunn, Jr. | F24J 2/38 136/245 |
| 2009/0190078 A1 | 7/2009 | Mikami et al. | |
| 2009/0207383 A1 | 8/2009 | Hirahara et al. | |
| 2009/0243824 A1 | 10/2009 | Peterson et al. | |
| 2010/0186890 A1 | 7/2010 | Kitada et al. | |
| 2010/0254002 A1 | 10/2010 | Merrill et al. | |
| 2011/0170184 A1 | 7/2011 | Wolk | |
| 2011/0188125 A1 | 8/2011 | Takenaka et al. | |
| 2011/0193814 A1 | 8/2011 | Gay et al. | |
| 2011/0261450 A1* | 10/2011 | Howes | G03B 21/56 359/443 |
| 2012/0050687 A1 | 3/2012 | Berry et al. | |
| 2012/0154753 A1 | 6/2012 | O'Connell et al. | |
| 2012/0229893 A1 | 9/2012 | Hebrink et al. | |
| 2012/0313839 A1 | 12/2012 | Smithwick et al. | |
| 2013/0036712 A1 | 2/2013 | Floding et al. | |
| 2013/0038933 A1 | 2/2013 | Wang et al. | |
| 2013/0063818 A1 | 3/2013 | Weber et al. | |
| 2013/0163082 A1 | 6/2013 | Tamada et al. | |
| 2013/0250614 A1 | 9/2013 | Thompson et al. | |
| 2014/0002800 A1 | 1/2014 | Edwards et al. | |
| 2014/0085723 A1 | 3/2014 | Hada et al. | |
| 2014/0295646 A1 | 10/2014 | Shinoda et al. | |
| 2014/0325822 A1 | 11/2014 | Bucci | |
| 2015/0128398 A1* | 5/2015 | Benlevi | A47F 10/06 29/426.2 |

OTHER PUBLICATIONS

USPTO Restriction Requirement dated Nov. 5, 2014; U.S. Appl. No. 13/559,828.
USPTO Non Final Office Action dated Mar. 27, 2015; U.S. Appl. No. 13/559,828.
USPTO Notice of Allowance dated Aug. 14, 2015; U.S. Appl. No. 13/559,828.

* cited by examiner

VISUAL DISPLAY SYSTEM FOR A HIGH-GAIN REFLECTIVE BEAM-SPLITTER

CROSS REFERENCE TO RELATED APPLICATIONS

This application is a division of U.S. Pat. No. 9,211,481, entitled "VISUAL DISPLAY SYSTEM AND METHOD OF CONSTRUCTING A HIGH-GAIN REFLECTIVE BEAM SPLITTER" and filed on Jul. 27, 2012 and granted on Dec. 15, 2015, in that the entirety of which is incorporated herein by reference as if set forth in full.

FIELD OF THE INVENTION

The present invention relates to Pepper's ghost illusionary accessories, more particularly to a partially reflective beam-splitter for use in providing high-gain reflective illusionary images on very large displays.

BACKGROUND

A wide variety of reflective devices is known in the art of partially reflective beam-splitters. For example, partially reflective beam-splitters, such as teleprompters, are well known and commonly used. Teleprompters provide the advantage of realizing reflective images of a text for a speaker to read while also providing the advantage of allowing the viewing audience is see the speaker without being visually encumbered by images of the reflected text.

While all of the above-described device and similar devices fulfill their respective, particular objectives and requirements, the aforementioned beam splitter devices and systems do not describe a system for use in constructing and providing high-gain reflective illusionary images on very large displays.

Therefore, a need exists for a new and improved system for use in constructing and displaying a high-gain reflective beam-splitter for use in displaying high-gain reflective illusionary images of very large displays.

SUMMARY OF THE INVENTION

The present visual display system and method of constructing a partially reflective beam-splitter is provided for use in theatrical overlapping reflecting illusions as those known as Pepper's ghosts. Accordingly to the principles of the present invention, overcomes a number of the shortcomings of other illusionary systems such as the present invention provides a means for constructing a large and high-gain reflective beam-splitter.

One variant of the visual display system and method of constructing a partially reflective beam-splitter is envisioned to include tables, step-down shelves, cutting bars, gripper units, tension units, a frame, a hoist assembly, and some dollies. One variant of the method of constructing and displaying the partially reflective beam-splitter of the visual display system includes the procedures of affixing, angling, applying, attaching, connecting, cutting, hooking, interconnecting, laying, mounting, obtaining, placing, plumbing, positioning, removing, repeating, rigging, sealing, securing, sliding, supporting, tightening, trimming, unrolling, and using.

In view of the foregoing disadvantages inherent in the lower reflective efficiency types of Pepper ghost display devices, the present invention provides an improved high-gain reflective beam-splitter device, which will be described subsequently in great detail, is to provide a new and improved visual display system and method of constructing a partially reflective beam-splitter which is not anticipated, rendered obvious, suggested, or even implied by the prior art, either alone or in any combination thereof.

There has thus been outlined, rather broadly, the more important features of the invention in order that the detailed description thereof that follows may be better understood, and in order that the present contribution of the art may be better appreciated.

The invention may also include any number of additional optional features such as an optional leveling unit for use in leveling the interconnected tables of the system. In addition, pneumatic air lines may also be included in the visual display system. Also a trolley may also be included as an optional feature in the visual display system. Furthermore, a roll of substantially transparent film may be optionally included in the visual display system Numerous aspects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

There has thus been outlined, rather broadly, the more important features of the invention in order that the detailed description thereof that follows may be better understood, and in order that the present contribution of the art may be better appreciated.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The invention will be better understood and aspects other than those set forth above will become apparent when consideration is given to the following detailed description thereof. Such description makes reference to the annexed drawings wherein.

The same reference numerals refer to the same parts throughout the various figures. The drawings are not necessarily to scale and in some instances proportions may have been exaggerated in order to more clearly depict certain features of the invention.

DETAILED DESCRIPTION OF THE PREFERRED EMBODIMENT

Figure 1:
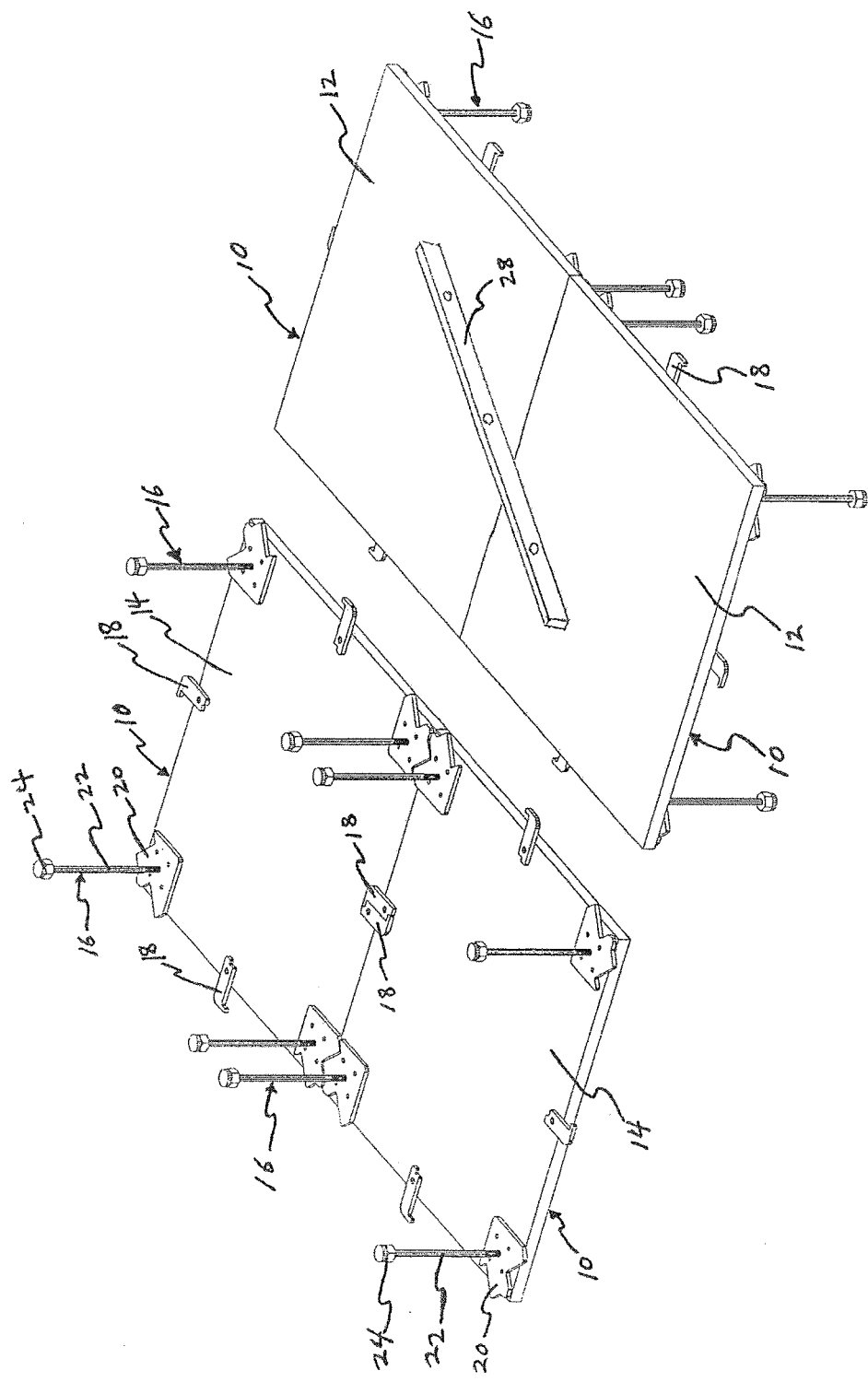
FIG. 1 depicts top and bottom perspective views of interconnected tables of one of the embodiments of the visual display system constructed in accordance with the principles of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. It will be understood that when a layer is referred to as being "on" another layer or substrate, it can be directly on the other layer or substrate, or intervening layers may also be present. In the drawings, the thicknesses of layers and regions are exaggerated for clarity and like reference numerals denote like elements.

The following detailed embodiments presented herein are for illustrative purposes. That is, these detailed embodiments are intended to be exemplary of the present invention for the purposes of providing and aiding a person skilled in the pertinent art to readily understand how to make and use of the present invention.

Further, it should be understood that, although steps of various the claimed method may be shown and described as being in a sequence or temporal order, the steps of any such method are not limited to being carried out in any particular sequence or order, absent an indication otherwise. That is, the claimed method steps are to be considered to be capable of being carried out in any sequential combination or permutation order while still falling within the scope of the present invention.

Referring now to the drawings, and in particular FIGS. 1 to 14 thereof, one preferred embodiment of the present invention is shown and generally designated by the reference numeral 10. One preferred embodiment of the visual display system for use in constructing and displaying a partially reflective beam-splitter 98 comprises a plurality of tables 10; a plurality of step-down shelves 30; a plurality of cutting bars 78; a plurality of gripper units 50; a plurality of tension units 72; a frame 94; a hoist assembly 100; and a plurality of dollies 92.

The tables 10 may be any type of commercially available table 10 as long as they are substantially planar. It is preferable but not mandatory that the tables 10 are configured to be interconnectable to each other. One preferred embodiment of the tables 10 is that each table 10 comprises an upper surface 12; a lower surface 14; a plurality of height adjustable legs 16 attached to the lower surface 14; and a plurality of latches 18 attached to the lower surface 14. Each leg 16 of the preferred embodiment of the tables 10 may comprise an interlocking base 20 attached to the lower surface 14; a shaft 22 attached to the interlocking base 20; and a foot 24 attached to the shaft 22.

The step-down shelves 30 may be any type of commercially available step-down shelves 30 as long as they are substantially planar and can be aligned lower and adjacent to the tables 10. One preferred embodiment of the step-down shelves 30 is that each step-down shelf 30 comprises: a top surface 32; a bottom surface 34; a plurality of height adjustable supports 36 attached to the bottom surface 34; and a plurality of claspers 44 attached to the bottom surface 34. Each support of the preferred step-down shelves 30 may comprise an interlocking plate 38 attached to the bottom surface 34; a shank 40 attached to the interlocking plate 38; and a footer 42 attached to the shank 40.

The gripper units 50 may be any type of commercially available type of gripper unit 50 as long as they can firmly grip onto the multilayered film unit 88. One preferred embodiment is that each gripper unit 50 comprises a clamp 52 and a pull unit 64. A clamp 52 of each preferred gripper unit 50 may comprise a hinge unit 54 pivotally connected together two opposing jaws 56; pads 58 attached to the jaws 56; a set screw 60 attached to at least one of the jaws 56; and a rear opening 62. A pull unit 64 of each preferred gripper unit 50 may comprise a pull unit 64 which is configured to be slideably engagable with the clamp 52. The pull unit 64 may comprise a pull bar 66; and a coupler 68 slideably engagable with the rear opening 62 of the clamp 52. The pull unit 64 may optionally have stabilizer rods 70. The pads 58 attached to the jaws 56 of the clamp 52 may be made of any commercially made material as long as they is able to firmly grip onto the multilayered film unit 88. For instance, the pads 58 may comprise a polymeric material selected from at least one of a group consisting of polychloroprene, silicone rubber, isobutylene-isoprene polymer, flexible PVC, natural rubber, low density polyethylene, hydrin rubber, vinylbenzyl chloride styrene-butadiene rubber, chlorobutyl rubber, bromobutyl rubber, bromomethyl styrenebutyl rubber, maleic acid styrene-butadiene rubber, carboxylic acid styrene-butadiene rubber, epoxyisoprene rubber, maleic acid modified natural rubber, maleic acid ethylene propylene rubber and carboxylic acid nitrile-butadiene rubber, butyl rubber, epichlorohydrin rubber, nitrile rubber, hydrogenated nitrile rubber, styrene-butadiene rubber, urethane rubber, fluorinated rubber, silicon rubber, styrene-ethylene-butylene-styrene (SEBS) rubber, ethylene-propylene rubber, ethylene-propylene-diene (EPDM) rubber, butadiene rubber, chlorosulfonated polyethylene (CSPE) synthetic rubber, ethylene vinyl acetate rubber and acryl rubber.

The tension units 72 may be any type of commercially available type of tension units 72 as long as they are can provide a controlled tension between the gripper units 50 and the frame 94. Some examples of the tension units 72 could be springs, wire, string, rubber bands, and even screw on hooks. One preferred embodiment is that each tension unit is a pneumatic cylinder tension unit 72 having one input feed line connection 74. Another preferred embodiment is that each tension unit 72 comprises a pneumatic cylinder tension unit 72 which has one input feed line and a lock line connection 76 so that the tension in the tension unit 72 can be locked in place.

The frame 94 may be any type of commercially available type of frame 94 so long as the frame 94 can support the partially reflective beam-splitter 98. One preferred embodiment is that the frame 94 comprises a truss frame 94.

The hoist assembly 100 may be any type of commercially available type hoist assembly 100 so long as they hoist assembly 100 can support the frame 94 holding the partially reflective beam-splitter 98. One preferred embodiment is that the hoist assembly 100 comprises a pulley 102; a cable 104; and a jack 106.

Any number of additional optional features may be included in the visual display system. For instance an optional leveling unit 28 may also be included in the visual display system. Also an optional set of pneumatic air lines 96 may also be included in the visual display system. Also a trolley 108 may also be optionally included in the visual display system. Also a roll 80 of substantially transparent film 84 may be optionally included in the visual display system. This substantially transparent film 84 may be any known commercially available transparent film such as those made from polymeric materials selected from at least one of a group consisting of polyethylene, polypropylene, polybutylene, polycarbonate, polyimide, polystyrene, polymethylmethacrylate, polydimethylsiloxane, poly(lactic-co-glycolic acid), polyethylene terephthalate (PET), polyvinylidene chloride, polyamides, polyether block amides, trinitrotrimethylenetriamine, polycaprolactan, polytetrafluoroethylene, vinylidene fluoride, hexafluoropropylene, polyvinylchloride, polyvinylbromide, polysaccharides, polyesters, polyamides, aromatic polyamides, polyurethanes, polysiloxanes, aromatic polymers, phenol polymers, polysulfides, polyacetals, halogenated polyolefins, polyethylene oxides, polyacrylates, polymethacrylates, polycarbonates, polydienes, and hexamethylene diamine adipic acid polymers. One preferred polymeric material of the transparent film is that it is made of polyethylene terephthalate (PET).

Yet another preferred embodiment of the visual display system comprises a table 10 with step-down shelves 30; a cutting bar 78; a gripper unit 50; a tension unit 72; and a frame 94.

One preferred embodiment of constructing and displaying the partially reflective beam-splitter 98 comprises the steps of affixing, angling, applying, attaching, connecting, cutting, hooking, interconnecting, laying, mounting, obtaining, placing, plumbing, positioning, removing, repeating, rigging, sealing, securing, sliding, supporting, tightening, trimming, unrolling, and using.

The obtaining step comprises obtaining a system a visual display system comprising: a plurality of tables 10; a plurality of step-down shelves 30; a plurality of cutting bars 78; a plurality of gripper units 50 wherein each gripper unit 50 comprises: a clamp 52 comprising: a hinge unit 54 pivotally connected together two opposing jaws 56; pads 58 attached to the jaws 56; a set screw 60 attached to at least one of the jaws 56; and a rear opening 62; and pull unit 64 slideably engagable with the clamp 52, wherein the pull unit 64 comprises: a pull bar 66; and a coupler 68 slideably engagable with the rear opening 62 of the clamp 52; a plurality of tension units 72; a frame 94; a hoist assembly 100 comprising: a pulley 102; a cable 104; and a jack 106; a plurality of dollies 92; a trolley 108; a leveling unit 28; a pneumatic air line; a trolley 108; and a roll 80 of substantially transparent film 84.

The using step comprises using the leveling unit 28 to level the tables 10.

The interconnecting step comprises interconnecting together the tables 10.

The connecting step comprises connecting the step-down shelves 30 around the interconnected tables 10.

The laying step comprises laying down the cutting bars 78 onto the connected step-down shelves 30 such that the cutting bars 78 are distributed around the interconnected tables 10.

The hooking step comprises hooking up the roll 80 of substantially transparent film 84 onto the dollies 92.

The affixing step comprises affixing a trailing edge 82 of the roll 80 of the substantially transparent film 84 onto the connected step-down shelves 30.

The unrolling step comprises unrolling a portion of the roll 80 of the substantially transparent film 84 over the interconnected tables 10.

The cutting step comprises cutting the unrolled portion of the roll 80 of substantially transparent film 84 to leave a sheet 86 of substantially transparent film 84 on the interconnected tables 10.

The repeating step comprises repeating the affixing, unrolling and cutting procedures to build a multilayered film unit 88.

The trimming step comprises trimming the multilayered film unit 88 by using the cutting bars 78 as guides.

The removing step comprises removing the cutting bars 78 away from the interconnected table 10 after completing the trimming procedure.

The positioning step comprises positioning the clamps 52 around the trimmed multilayered film unit 88.

The tightening step tightening comprises tightening down the set screw 60 of the each positioned clamp 52 so that the pads 58 are holding onto the trimmed multilayered film unit 88.

The sliding step comprises sliding the proximate interfacing unit of the pull unit 64 into the rear opening 62 at the back end of each positioned clamp 52 to form the gripper units 50 around the trimmed multilayered film unit 88.

The placing step comprises placing the frame 94 around the trimmed multilayered film unit 88.

The mounting step comprises mounting the tension units 72 to the each positioned clamp 52 at the pull bar 66 and onto the positioned frame 94.

The plumbing step comprises plumbing the pneumatic air lines 96 to the mounted tension units 72.

The applying step comprises applying pressure to the plumbed pneumatic air lines 96 to secure the trimmed multilayered film unit 88 into a substantially planar configuration.

The securing step comprises securing the tension units 72 in place applying the pressure to maintain the substantially planar configuration of the trimmed multilayered film unit 88 within the frame 94.

The sealing step comprises sealing gripper units 50 around all exposed corners 90 of the trimmed multilayered film unit 88 mounted to make the partially reflective beam-splitter 98.

The attaching step comprises attaching the dollies 92 to the frame 94 of the beam-splitter 98.

The rigging step comprises rigging the hoist assembly 100 and the trolley 108 to the frame 94 of the beam-splitter 98.

The angling step comprises angling up the frame 94 of the beam-splitter 98 by using the hoist assembly 100 to a viewing angle.

The supporting step comprises supporting the angled up frame 94 of the beam-splitter 98 by using the jack 106 and the hoist assembly 100 to support the frame 94.

Yet another embodiment of a method of constructing and displaying the partially reflective beam-splitter 98 comprises the steps of adjoining, aligning, tensioning, clamping, conjoining, coupling, procuring, reiterating, removing, slicing, and unraveling.

The procuring step comprises procuring a system a visual display system comprising: a table 10 with step-down shelves 30; a cutting bar; a plurality of gripper units 50; a plurality of tension units 72; and a frame 94.

The adjoining step comprises adjoining a trailing edge 82 of the roll 80 of the substantially transparent film 84 onto the connected step-down shelves 30.

The unraveling step comprises unraveling a portion of the roll 80 of the substantially transparent film 84 over table.

The slicing step comprises slicing off the unraveled portion of the roll 80 of substantially transparent film 84 to leave a sheet 86 of substantially transparent film 84 on the table The reiterating step comprises reiterating the adjoining, unraveling and shearing procedures to build a multilayered film unit 88.

The clamping step comprises clamping the gripper units 50 around the multilayered film unit 88.

The aligning step comprises aligning the frame 94 around the trimmed multilayered film unit 88.

The coupling step comprises coupling the gripper units 50 to the frame 94.

The conjoining step comprises conjoining the tension units 72 onto the connected gripper units 50 and onto the frame 94.

The tensioning step comprises tensioning the tension units 72 to secure the trimmed multilayered film unit 88 into a substantially planar configuration within the frame 94.

The removing step comprises removing the tension units 72.

Referring now to FIG. 1 which depicts top and bottom perspective views of interconnected tables 10 of the visual display system of the present invention. The interconnected tables 10 are shown interconnected together via latches 18. Each table 10 is shown having an upper surface 12; a lower surface 14; a plurality of height adjustable legs 16 attached to the lower surface 14; and a plurality of latches 18 attached to the lower surface 14. Each leg 16 of the tables 10 is shown having an interlocking base 20 attached to the lower surface 14; a shaft 22 attached to the interlocking base 20; and a foot 24 attached to the shaft 22. Also shown is the optional leveling unit 28 used to substantially planarize the upper surfaces 12 of the interconnected tables 10.

Figure 2:
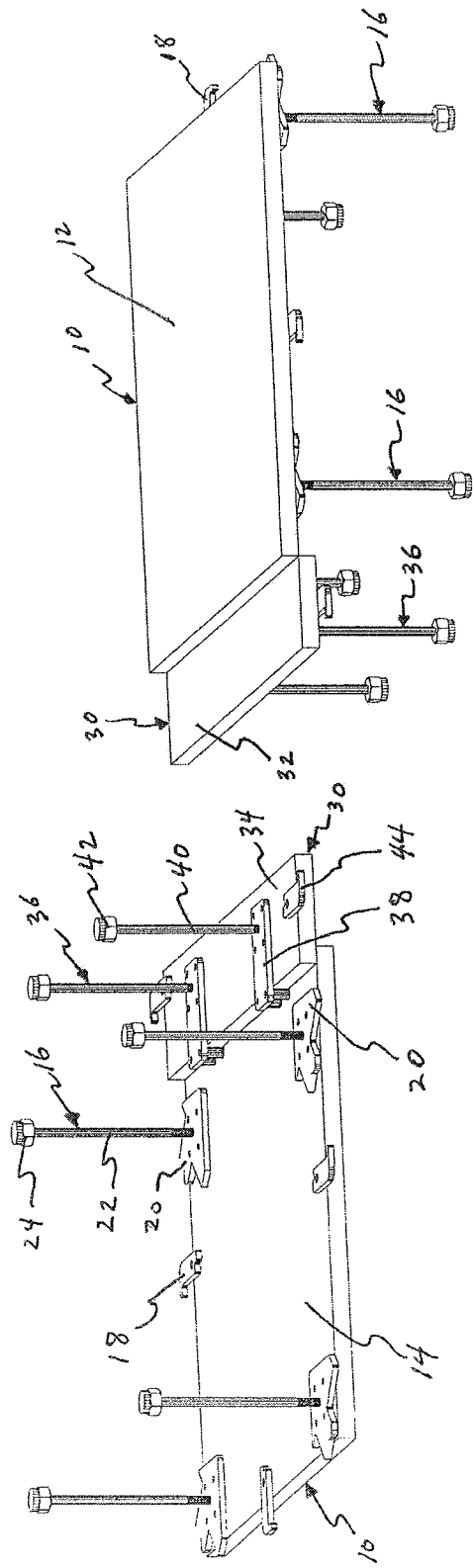
FIG. 2 depicts top and bottom perspective views of a table interconnected to a step-down shelf of one embodiment of the visual display system of the present invention.

Referring now to FIG. 2 which depicts top and bottom perspective views of a table 10 interconnected to a step-down shelf 30 of one embodiment of the visual display system of the present invention. The step-down shelf 30 is shown attached to the table 10 via interlocking plates 38. The step-down shelf 30 is shown having a top surface 32; a bottom surface 34; a plurality of height adjustable supports 36 attached to the bottom surface 34; and a plurality of claspers 44 also attached to the bottom surface 34. Each support of the step-down shelves 30 is shown comprising an interlocking plate 38 attached to the bottom surface 34; a shank 40 attached to the interlocking plate 38; and a footer 42 attached to the shank 40.

Figure 3:
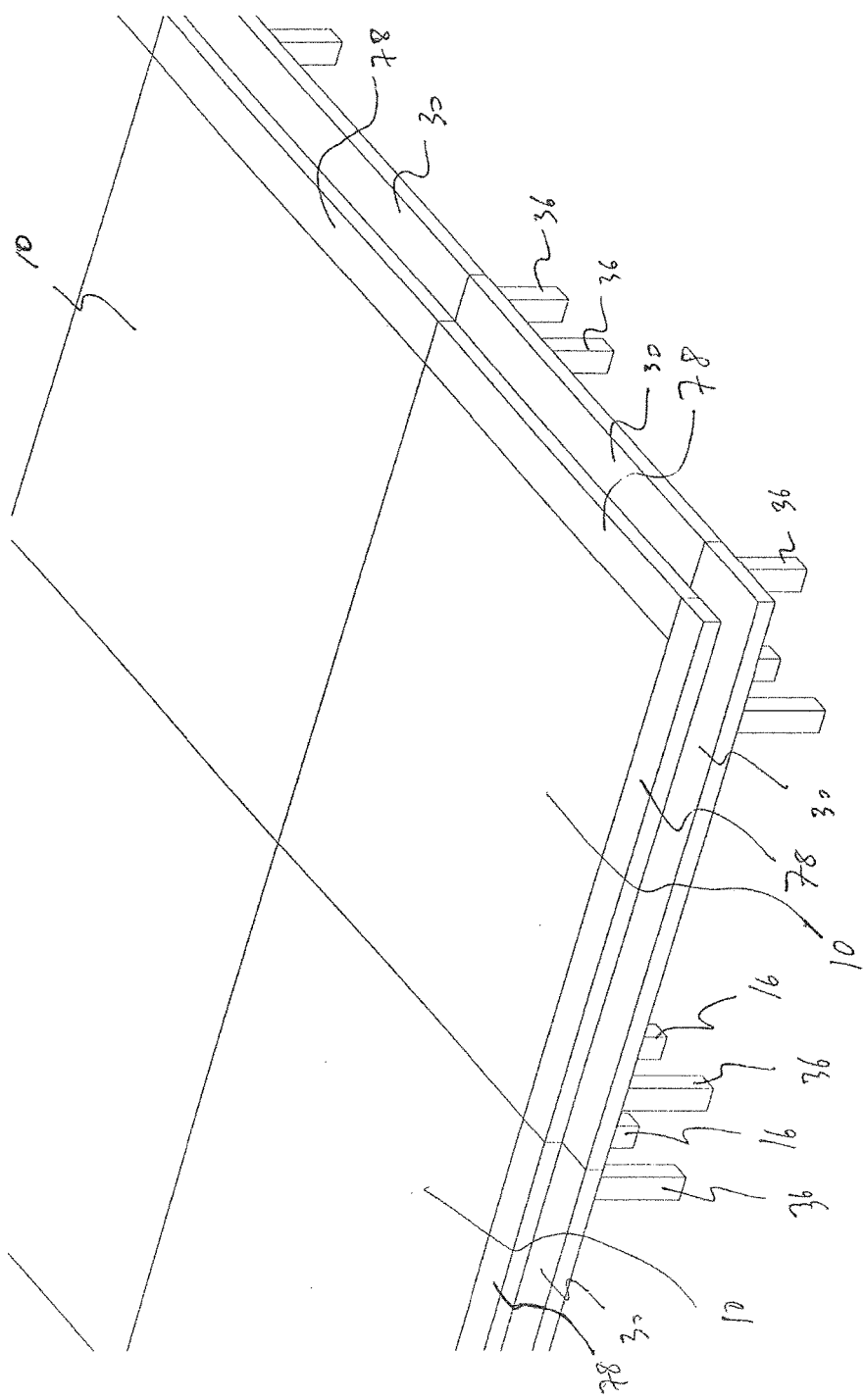
FIG. 3 is depicts a partial top perspective view of interconnected tables and step-down shelves which also shows cutting bars of one embodiment of the visual display system of the present invention.

Referring now to FIG. 3 which depicts a partial top perspective view of interconnected tables 10 and step-down shelves 30. A plurality of cutting bars 78 is shown mounted flush long the sides of interconnected tables 10 and on the step-down shelves 30. Also shown are some of the height adjustable legs 16 of the interconnected tables 10 and some of the height adjustable supports 36 of the step-down shelves 30.

Figure 4:
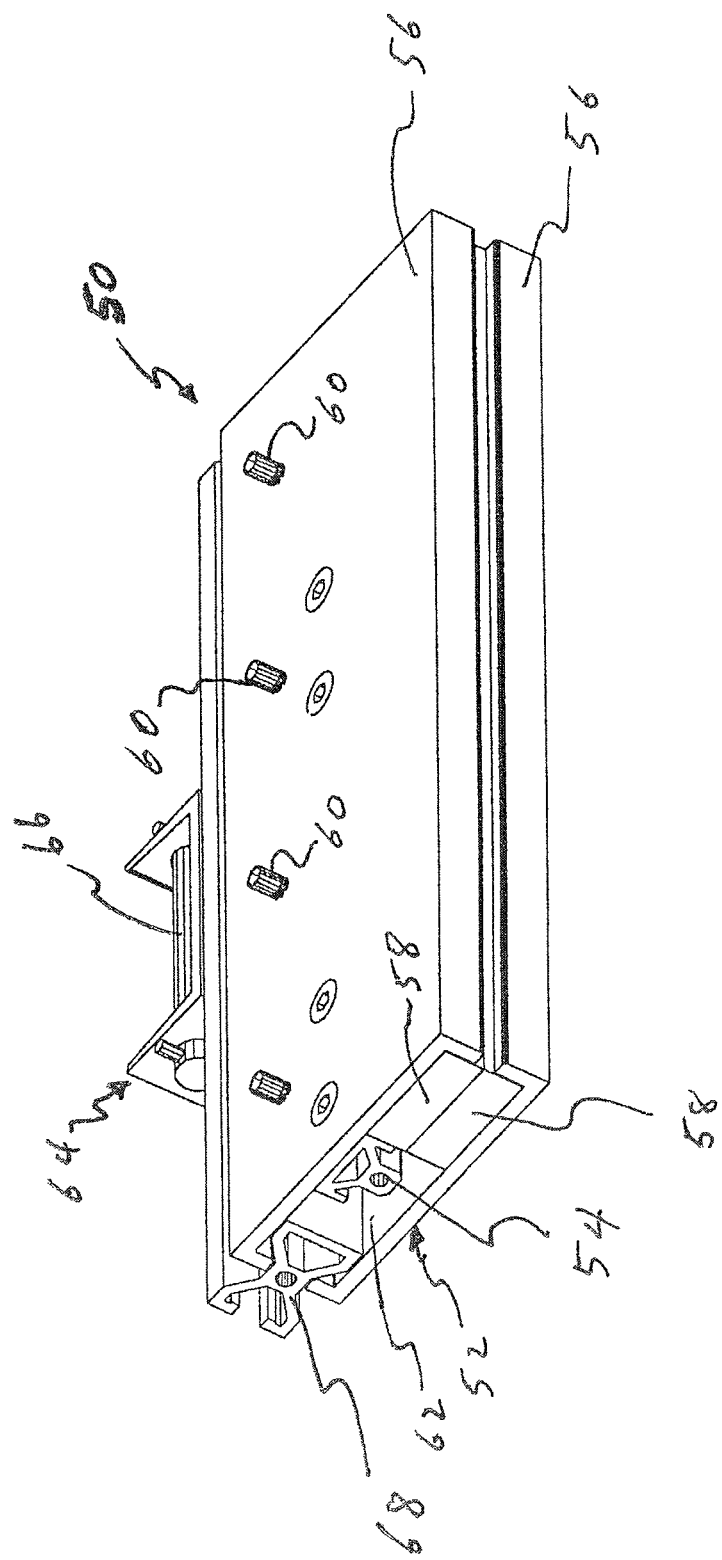
FIG. 4 is perspective view of one embodiment of a gripper unit of the visual display system of the present invention.

Referring now to FIG. 4 which depicts a perspective view of one embodiment of a gripper unit. The gripper unit 50 is shown having a clamp 52 and a pull unit 64. The clamp 52 is shown having a hinge unit 54 pivotally connected together two opposing jaws 56; pads 58 that are attached to the jaws 56; a set screw 60 attached to at least one of the jaws 56; and a rear opening 62. The pull unit 64 is shown slideably engaged within the rear opening 62 of the clamp 52. The pull unit 64 is shown having a pull bar 66 and a coupler 68 which is slideably engaged with the rear opening 62 of the clamp 52.

Figure 5A:
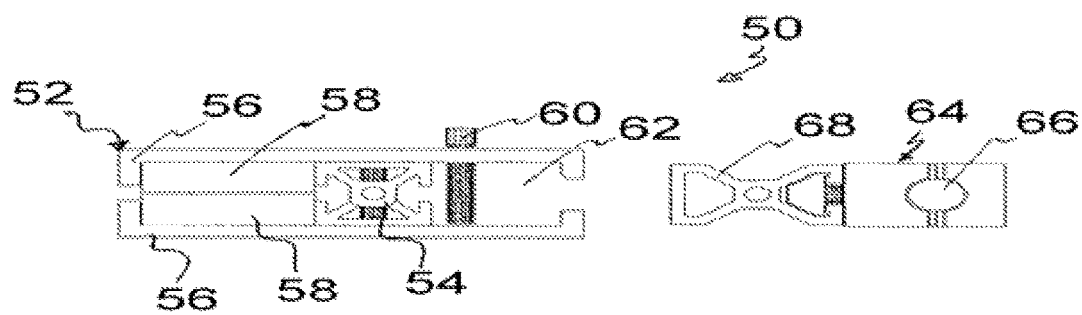
FIG. 5A is a side view of the clamp and the pull bar of one embodiment of a gripper unit depicting various points in a procedure used to firmly grip the gripper unit onto the multilayered film unit of one embodiment of the visual display system of the present invention.
Figure 5B:
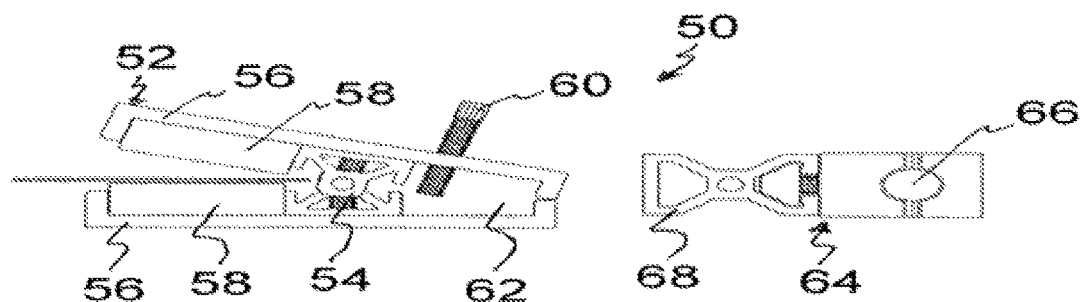
FIG. 5B is a side view of the clamp and the pull bar of one embodiment of a gripper unit depicting various points in a procedure used to firmly grip the gripper unit onto the multilayered film unit of one embodiment of the visual display system of the present invention.
Figure 5C:
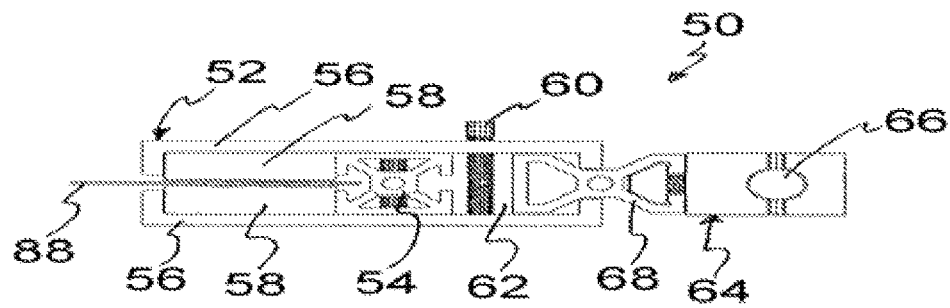
FIG. 5C is a side view of the clamp and the pull bar of one embodiment of a gripper unit depicting various points in a procedure used to firmly grip the gripper unit onto the multilayered film unit of one embodiment of the visual display system of the present invention.
Figure 5D:
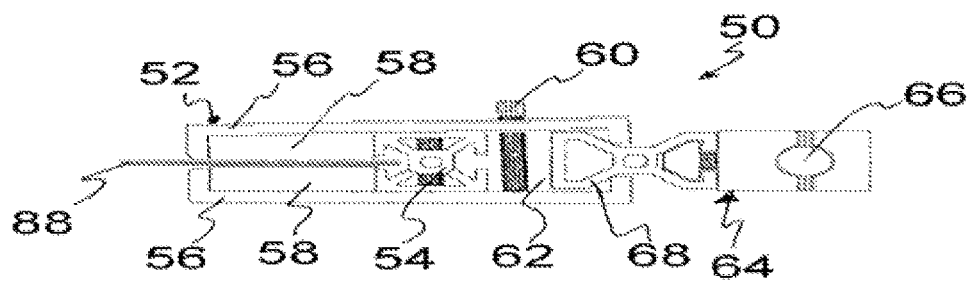
FIG. 5D is a side view of the clamp and the pull bar of one embodiment of a gripper unit depicting various points in a procedure used to firmly grip the gripper unit onto the multilayered film unit of one embodiment of the visual display system of the present invention.

Referring now to FIG. 5A, FIG. 5B, FIG. 5C, and FIG. 5D which are side views of the clamp 52 and the pull bar 66 of one embodiment of a gripper unit 50 depicting various points in a procedure used to firmly grip the gripper unit 50 onto the multilayered film unit 88 of one embodiment of the visual display system of the present invention. The clamp 52 is shown having a hinge, two opposing jaws 56, pads 58; a set screw 60, and a rear opening 62. The pull unit 64 is shown having a pull bar 66 and a coupler 68. As shown in FIG. 5A, the clamp 52 and pull bar 66 are not connected together. As shown in FIG. 5B, the set screw 60 is loosened to open up the opposing jaws 56 so that multilayered film unit 88 can be inserted therein. As shown in FIG. 5C, the pads 58 are positioned to firmly grab onto the multilayered film unit 88 by closing the opposing jaws 56 and the set screw 60 is used to firmly lock the opposing jaws 56 onto the multilayered film unit 88. In FIG. 5C, the pull bar 66 is shown slideably inserted within the rear opening 62 of the clamp 52 in which the pads 58 and the opposing jaws 56 to remain locked onto an edge of the multilayered film unit 88. In FIG. 5D, the pull bar 66 is shown being forced away from the clamp 52 which results in the coupler 68 of the pull bar 66 forcing the rear ends of the opposing jaws 56 apart and as a result the front ends of the opposing jaws 56 are force the pads 58 to grip more firmly onto the edge of the multilayered film unit 88. It is believed that this substantially contributes to progressive clamping onto the edges of the multilayered film unit 88 once air is applied to the pneumatic cylinders 72 which progressively pulls in an angular fashion the puller 68 and which engages the rear opening 62 of the clamp 52 of the gripper unit 50. This allows for equalizing the tension in unison by exerted on the edges of the multilayered film unit 88 by the clamps 52

Figure 6:
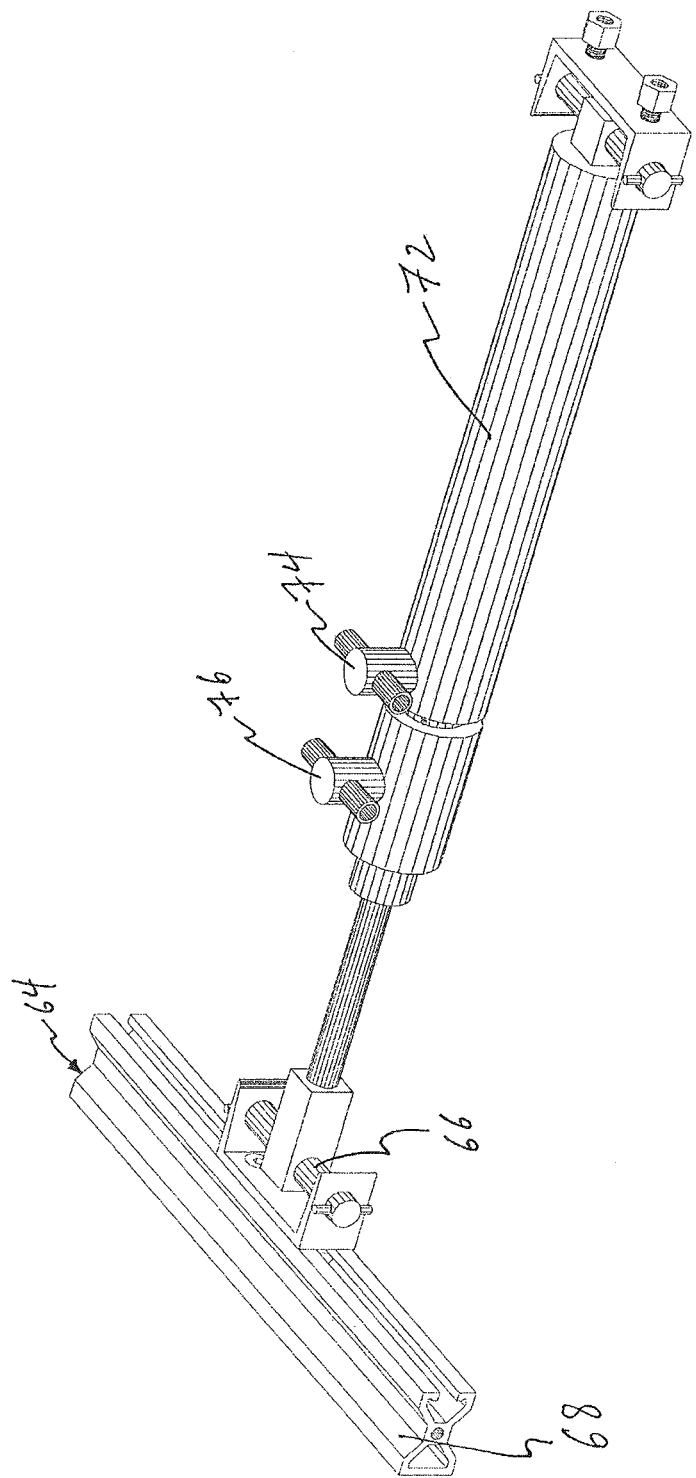
FIG. 6 is a perspective view of one embodiment of a pull unit coupled to a tension unit of the visual display system of the present invention.

Referring now to FIG. 6 which is a perspective view of one embodiment of a pull unit 64 coupled to a tension unit. In this embodiment, the pull unit 64 is shown having a pull bar 66, and a coupler 68. The tension unit may be any type of tension unit such as being a string, a spring, a threaded bolt, a bungee cord, a pneumatic cylinder. The tension unit shown coupled to the coupler 68 of the pull unit 64. The particular tension unit shown comprises a pneumatic cylinder tension unit having an input feed line connection 74 and a lock line connection 76 so that the tension in the tension unit can be locked in place.

Figure 7A:
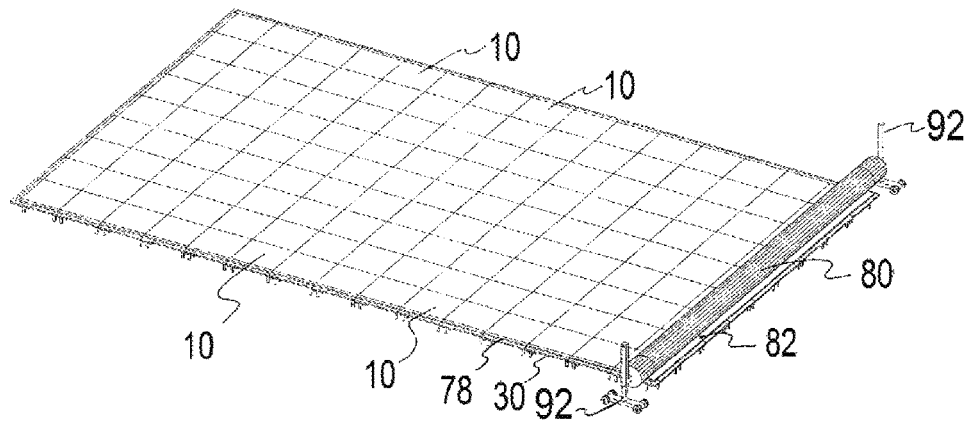
FIG. 7A is a perspective view of an interconnected table with step-down shelves and cutting bars being used to roll out a sheet of transparent film of one embodiment of the visual display system of the present invention.
Figure 7B:
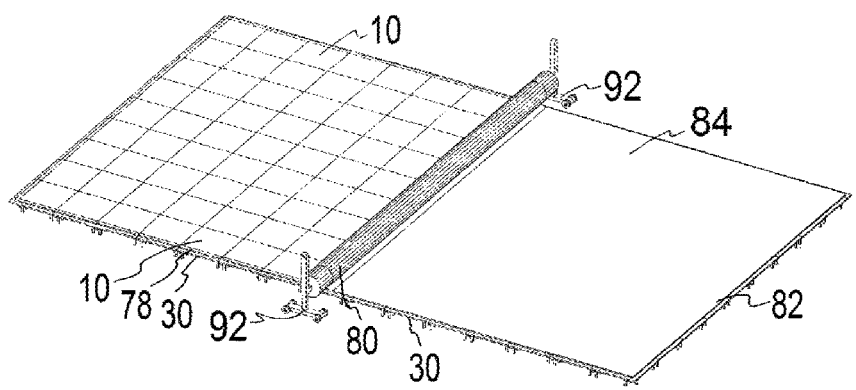
FIG. 7B is a perspective view of an interconnected table with step-down shelves and cutting bars being used to roll out a sheet of transparent film of one embodiment of the visual display system of the present invention.
Figure 7C:
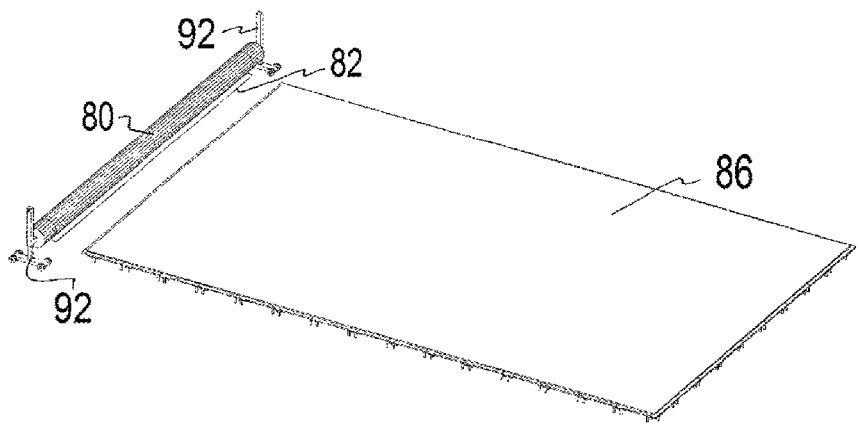
FIG. 7C is a perspective view of an interconnected table with step-down shelves and cutting bars being used to roll out a sheet of transparent film of one embodiment of the visual display system of the present invention.

Referring now to FIG. 7A, FIG. 7B, and FIG. 7C which depict perspective views of how to roll 80 out a sheet 86 of transparent film. After the interconnected tables 10 are substantially planarized, along with the step-down shelves 30 being connected to the interconnected tables 10, then the cutting bars 78 are laid down against the interconnected tables 10 and on the step-down shelves 30. A roll 80 of the substantially transparent film 84 is hooked up onto the dollies 92. A trailing edge 82 of the roll 80 of the substantially transparent film 84 is then affixed onto the connected step-down shelves 30. Then a portion of the roll 80 of the substantially transparent film 84 is carefully unrolled over and on top the interconnected tables 10, the cutting bars 78 and partially over the step-down shelves 30. Then the unrolled portion of the roll 80 of substantially transparent film 84 is cut which leaves a sheet 86 of substantially transparent film 84 on the interconnected tables 10. This process of affixing, unrolling, cutting is repeated until a desired number of layers of sheets 86 of the substantially transparent film 84 is prepared on the interconnected tables 10.

Figure 8:
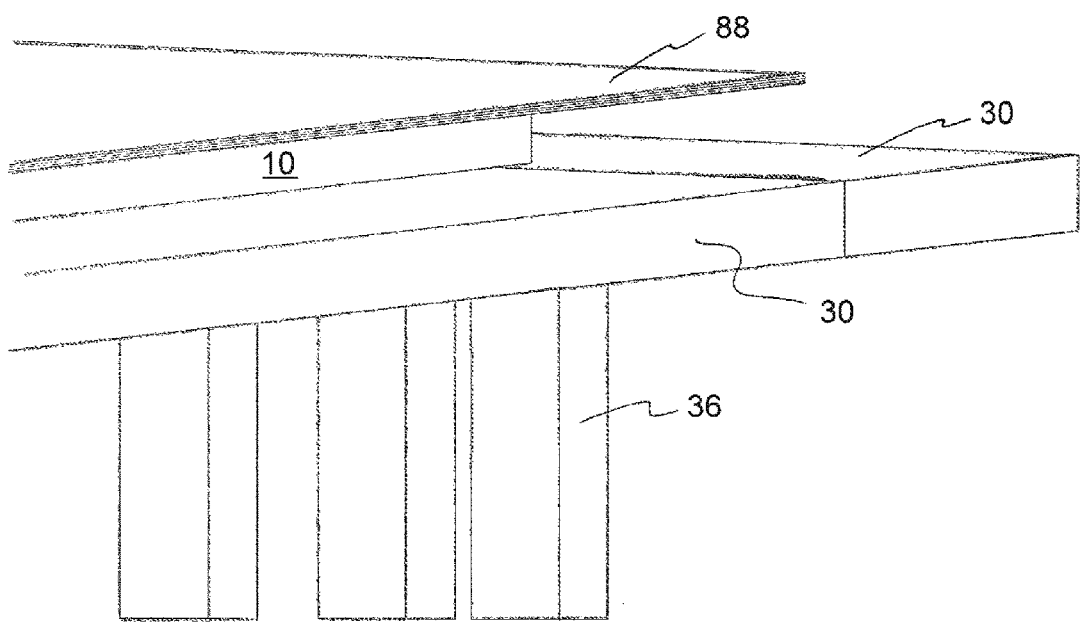
FIG. 8 is a perspective view of the multilayered film unit after being trimmed on the interconnected table with step down shelves of one embodiment of the visual display system of the present invention.

Referring now to FIG. 8 which depicts a perspective view of the multilayered film unit 88 which was prepared by trimming sheets 86 using a cutting edge and the cutting bars 78 for aligning the trimming. Also shown are some the step-down shelves 30 around the interconnected tables 10 with the multilayered film unit 88 overhanging the interconnected tables 10

Figure 9:
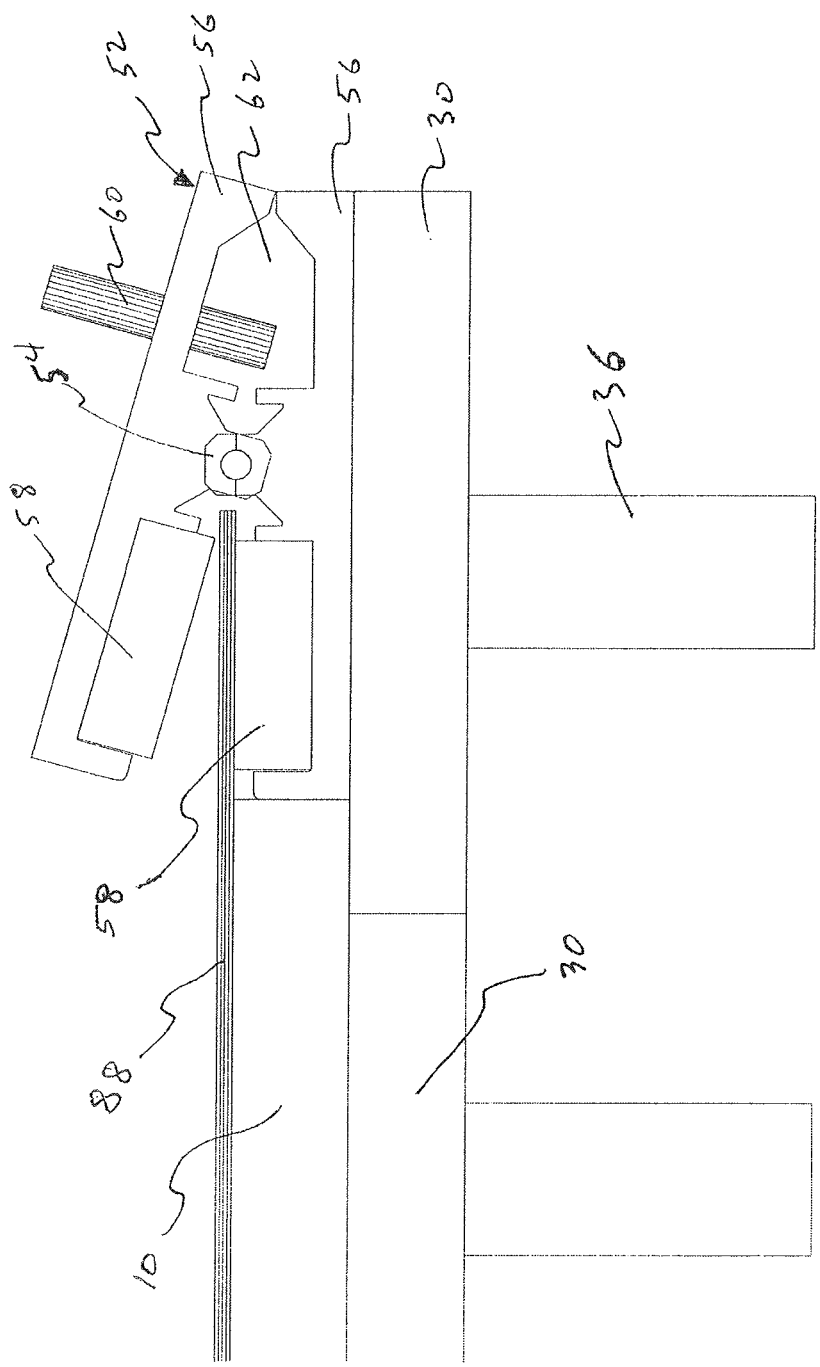
FIG. 9 is a side view of the trimmed multilayered film unit on the interconnected table with step-down shelves supporting the clamp of the gripper unit of one embodiment of the visual display system of the present invention.

Referring now to FIG. 9 which is a side view of the trimmed multilayered film unit 88 on the interconnected table 10 with step-down shelves 30 supporting the clamp 52 of the gripper unit. The clamp 52 is shown in an open position with a portion of the overhanging multilayered film unit 88 within the opened jaws 56. The clamp 52 is shown composed of a hinge unit 54, two opposing jaws 56, pads 58, a set screw 60, and a rear opening 62.

Figure 10:
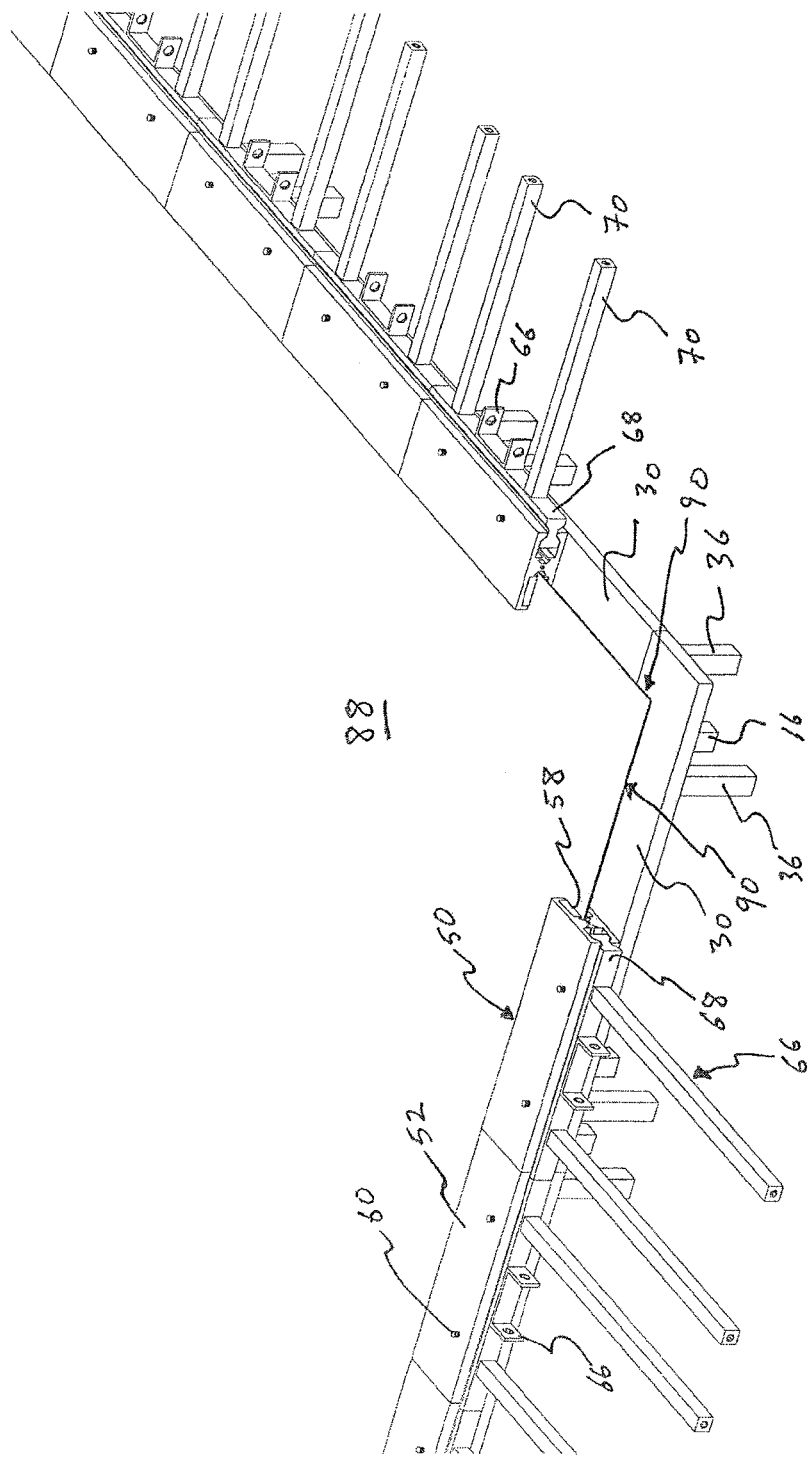
FIG. 10 is a partial perspective view of the trimmed multilayered film unit being gripped on by a plurality of gripper units of the visual display system of the present invention.

Referring now to FIG. 10 which depicts is a partial perspective view of the trimmed multilayered film unit 88 being gripped on by a plurality of gripper units 50 of the visual display system of the present invention. Also shown is a corner 90 of the trimmed multilayered film unit 88 not being gripped on by any clamp 52. Each of the gripper units 50 are shown to have a clamp 52 slidably connected to a pull unit 64 in which The pull unit 64 is shown having a pull bar 66, a coupler 68 and optional stabilizer rods 70.

Figure 11A:
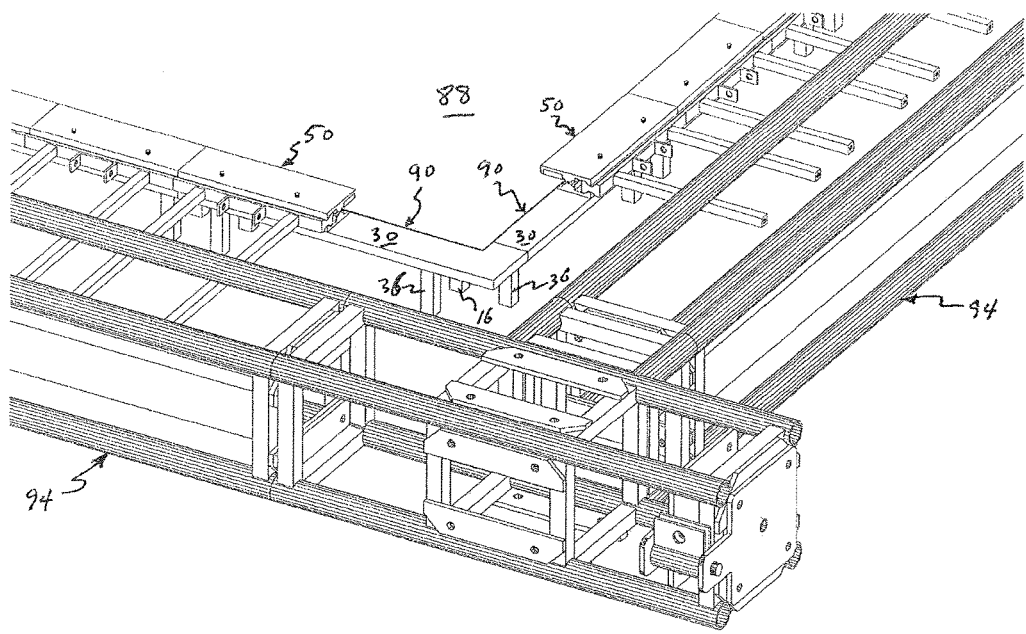
FIG. 11A is a partial perspective view of one embodiment of the frame placed around and secured to the multilayered film unit of the visual display system.
Figure 11B:
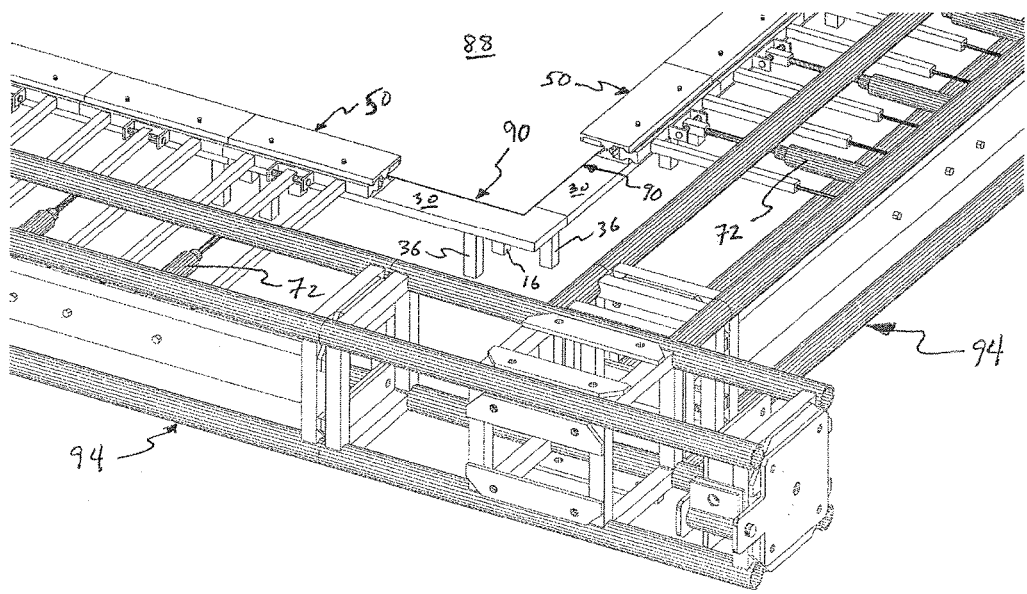
FIG. 11B is a partial perspective view of one embodiment of the frame placed around and secured to the multilayered film unit of the visual display system.

Referring now to FIG. 11A and FIG. 11B which are partial perspective views of a frame 94 placed around and then being secured to the multilayered film by interfacing the tension units 72 between the gripper units 50 and the frame 94.

Figure 12A:
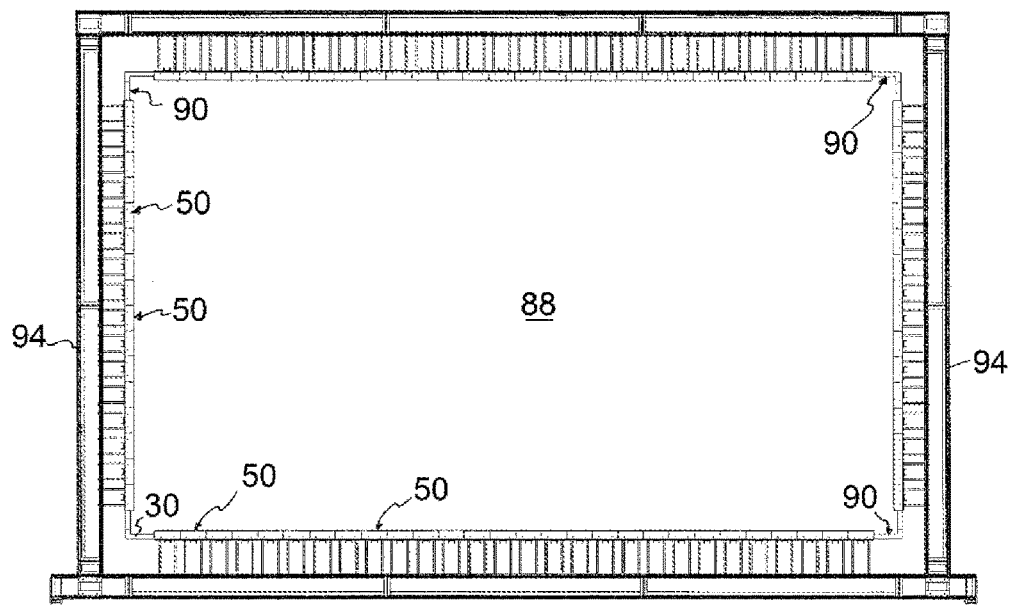
FIG. 12A is a top view of one embodiment of the frame secured to the multilayered film unit with pneumatic air lines connected to the tension units of the visual display system for preparing the theatrical beam splitter of the present invention.
Figure 12B:
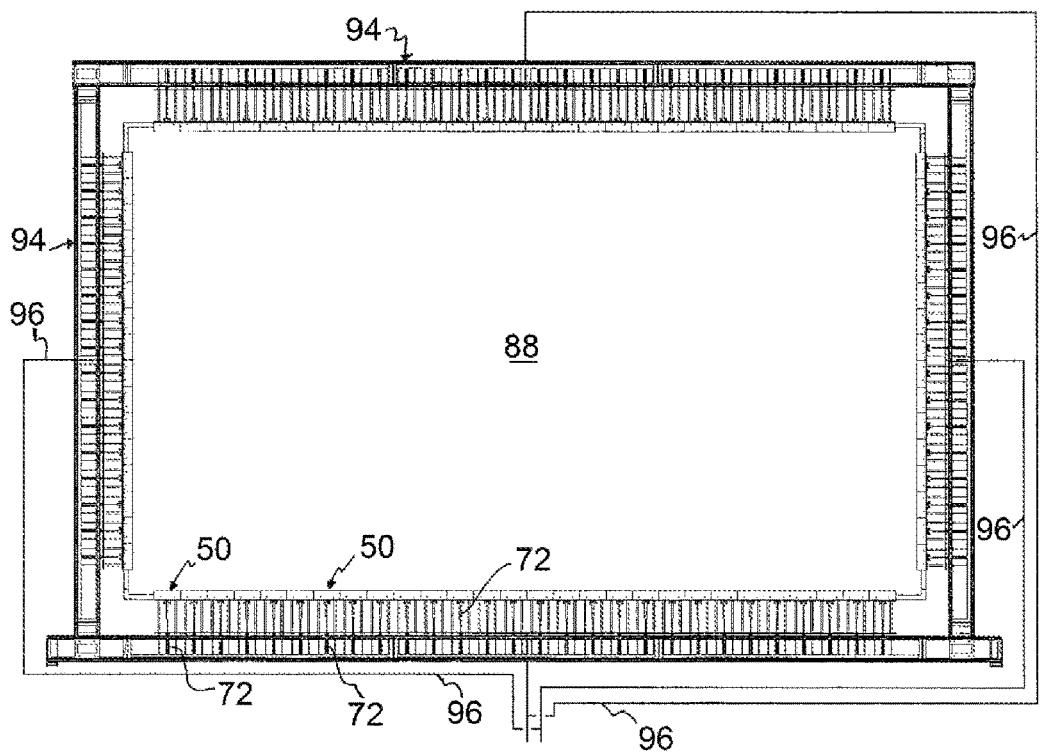
FIG. 12B is a top view of one embodiment of the frame secured to the multilayered film unit with pneumatic air lines connected to the tension units of the visual display system for preparing the theatrical beam splitter of the present invention.
Figure 13A:
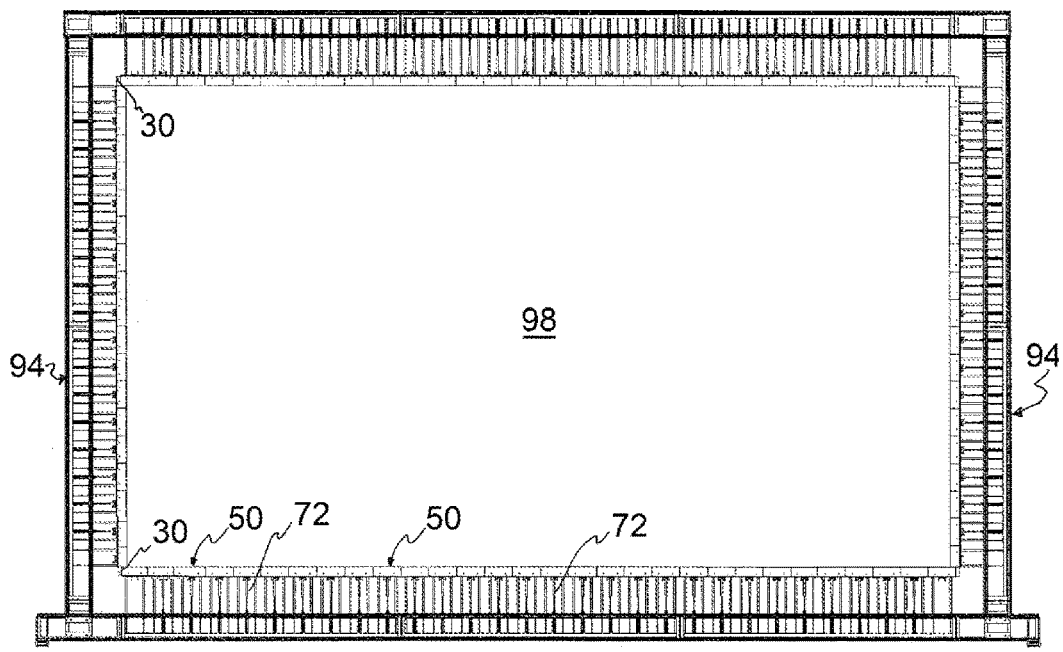
FIG. 13A is a top view of one embodiment of the frame secured to the multilayered film unit of the visual display system for preparing the theatrical beam splitter of the present invention.
Figure 13B:
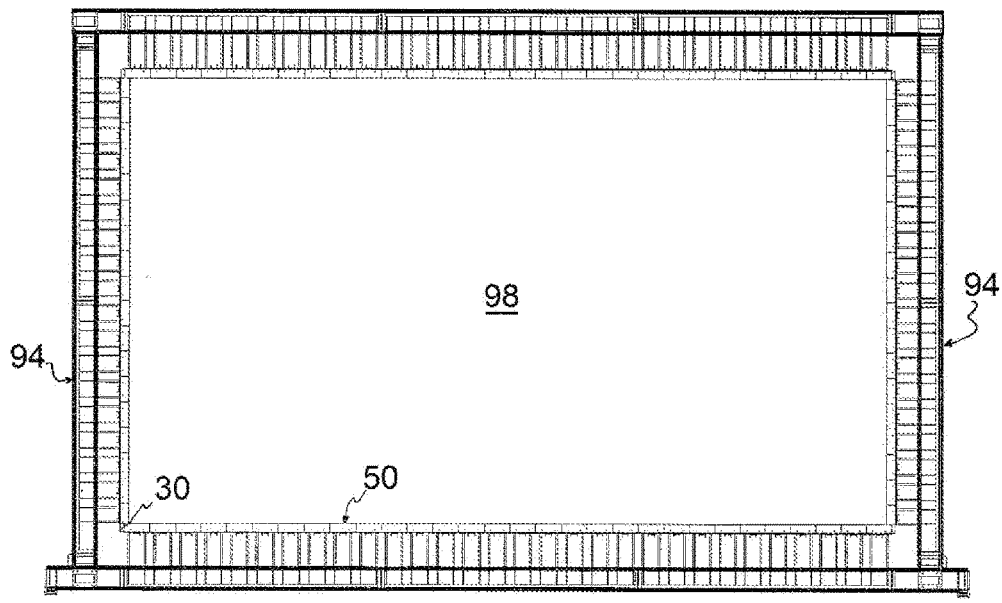
FIG. 13B is a top view of one embodiment of the frame secured to the multilayered film unit of the visual display system for preparing the theatrical beam splitter of the present invention.

Referring now to FIG. 12A and FIG. 12B which are top views of a frame 94 placed around and then being secured to the multilayered film by interfacing the tension units 72 between the gripper units 50 and the frame 94. Also shown are the optional pneumatic air lines 96 connected to the tension units 72 for providing the force in securing a relatively flat multilayered film mounted within the frame 94 for preparing the partially reflective beam-splitter 98 of the present invention;

Referring now to FIG. 13A and FIG. 13B which depict top views of one embodiment of the frame 94 secured to the multilayered film unit 88 of the visual display system for preparing the partially reflective beam-splitter 98 of the present invention. Once the tension units 72 are configured to provide the requisite force to secure a relatively flat multilayered film mounted within the frame 94, then that tensioning may be locked in place by the stabilizer rods 70 of the pull unit 64. As a result, the tension units 72, along with the pneumatic air lines 96, may subsequently be removed to minimize weight of the prepared the partially reflective beam-splitter 98 of the present invention.

Figure 14:
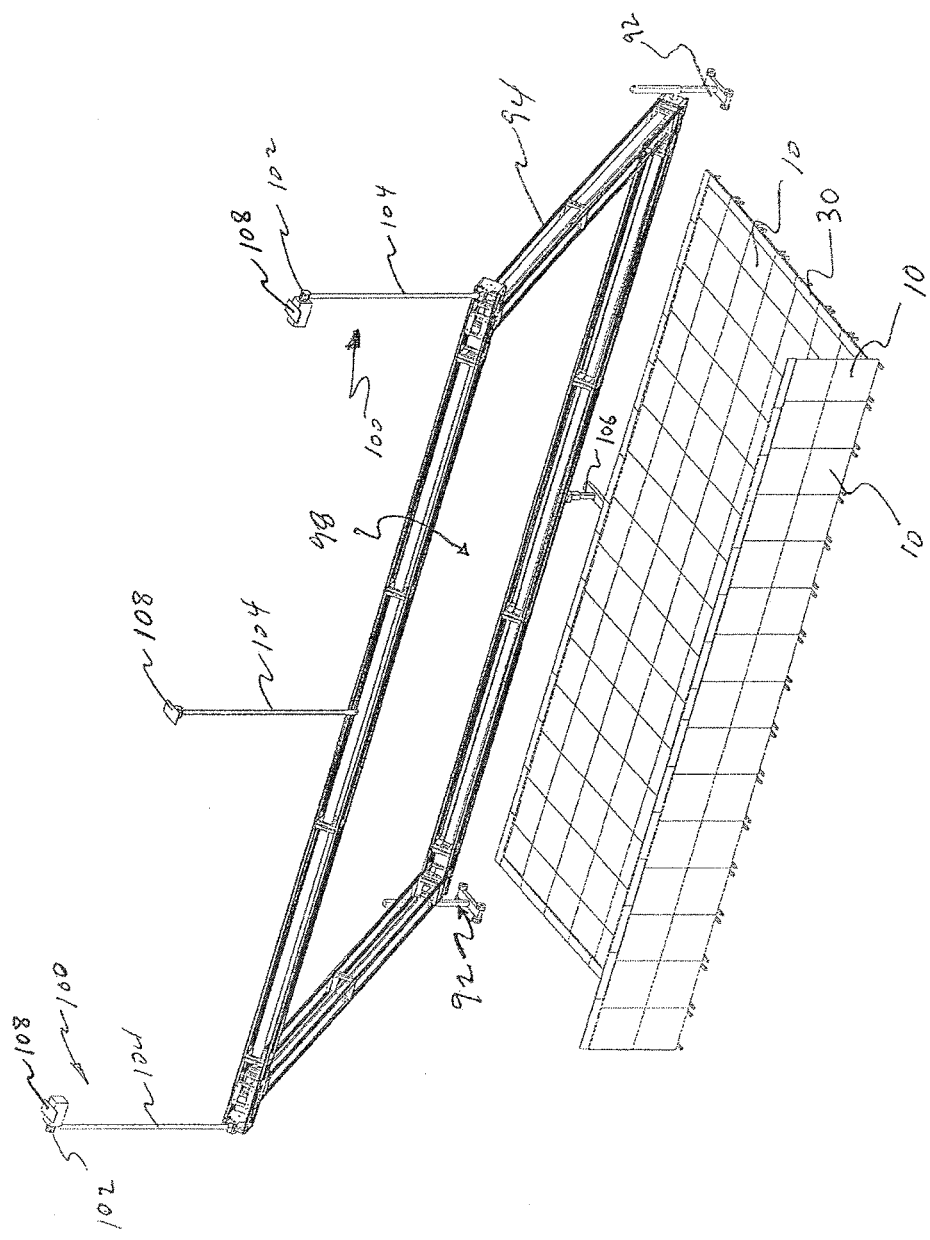
FIG. 14 is a perspective view of the fully assembled theatrical beam splitter of the visual display system of the present invention being supported and angled at a viewing angle.

Referring now to FIG. 14 which depicts a perspective view of the fully assembled partially reflective beam-splitter 98 of the visual display system which is supported and angled at a viewing angle. Also shown are the hoist assembly 100 that comprise a pulley 102; a cable 104; and a jack 106. Also shown is the optional trolley 108 connected to the hoist assembly 100 and the dollies 92 connected to the frame 94 for use in transporting the partially reflective beam-splitter 98.

While a preferred embodiment of the visual display system and method of constructing a partially reflective beam-splitter has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A visual display system for use in constructing a partially reflective beam-splitter, the system comprising:
    a plurality of tables;
    a plurality of step-down shelves,
    wherein each step-down shelf of the plurality of shelves comprises:
        a top surface;
        a bottom surface;
        a plurality of supports attached to the bottom surface in which each support of the plurality of supports comprises:
            a interlocking plate attached to the bottom surface;
            a shank attached to the interlocking plate; and
            a footer attached to the shank; and
        a plurality of claspers attached to the bottom surface;
    a plurality of cutting bars;
    a plurality to gripper units, wherein each gripper unit of the plurality of gripper units comprises:
        a clamp comprising:
            a hinge unit pivotally connected together to two opposing jaws;
            pads attached to the jaws;
            a set screw attached to at least one of the jaws; and
            a rear opening; and
        a pull unit slidably engageable with the clamp, wherein the pull unit comprises:
            a pull bar;
            stabilizer rods; and
            a coupler slidably engageable with the rear opening of the clamp;
    a plurality of tension units;
    a frame;
    a hoist assembly; and
    a plurality of dollies.

2. The system of claim 1, further comprising a leveling unit.

3. The system of claim 1, further comprising pneumatic air lines.

4. The system of claim 1, further comprising a trolley.

5. The system of claim 1, further comprising a roll of substantially transparent film.

6. The system of claim 5, wherein the substantially transparent film comprises a polymeric material selected from at least one of a group consisting of polyethylene, polypropylene, polybutylene, polycarbonate, polyimide, polystyrene, polymethylmethacrylate, polydimethylsiloxane, poly(lactic-co-glycolic acid), polyethylene terephthalate (PET), polyvinylidene chloride, polyamides, polyether block amides, trinitrotrimethylenetriamine, polycaprolactan, polytetrafluoroethylene, vinylidene fluoride, hexafluoropropylene, polyvinylchloride, polyvinylbromide, polysaccharides, polyesters, polyamides, aromatic polyamides, polyurethanes, polysiloxanes, aromatic polymers, phenol polymers, polysulfides, polyacetals, halogenated polyolefins, polyethylene oxides, polyacrylates, polymethacrylates, polycarbonates, polydienes, and hexamethylene diamine adipic acid polymers.

7. The system of claim 5, wherein the roll of substantially transparent film is made of polyethylene terephthalate (PET).

8. The system of claim 1, wherein the tables are configured to be interconnectable to each other.

9. The system of claim 1, wherein each table of the plurality of tables comprises:
    a upper surface;
    a lower surface;
    a plurality of legs attached to the lower surface; and
    a plurality of latches attached to the lower surface.

10. The system of claim 9, wherein the each leg of the plurality of legs comprises:
    an interlocking base attached to the lower surface;
    a shaft attached to the interlocking base; and
    a foot attached to the shaft.

11. The system of claim 1, wherein the each tension unit of the plurality of tension units comprises a pneumatic cylinder tension unit having one input feed line connection.

12. The system of claim 1, wherein the each tension unit of the plurality of tension units comprises a pneumatic cylinder tension unit having one input feed line and a lock line connection.

13. The system of claim 1, wherein the frame comprises a truss frame.

14. The system of claim 1, wherein the hoist assembly comprises:
    a pulley;
    a cable; and
    a jack.

15. A visual display system for use in constructing a partially reflective beam-splitter, the system comprising:
    a plurality of tables;
    a plurality of step-down shelves, wherein each step-down shelf of the plurality of step-down shelves comprises:
        a top surface;
        a bottom surface;
        a plurality of supports attached to the bottom surface in which each support of the plurality of supports comprises:
            an interlocking plate attached to the bottom surface;
            a shank attached to the interlocking plate; and
            a footer attached to the shank; and
        a plurality of claspers attached to the bottom surface;
    a plurality of cutting bars;
    a plurality of gripper units;
    a plurality of tension units;
    a frame;
    a hoist assembly; and
    a plurality of dollies.

13

16. The system of claim 15, wherein the each tension unit of the plurality of tension units comprises a pneumatic cylinder tension unit having one input feed line connection.

17. The system of claim 15, wherein the each tension unit of the plurality of tension units comprises a pneumatic cylinder tension unit having one input feed line and a lock line connection.

18. A visual display system for use in constructing a partially reflective beam-splitter, the system comprising:
- a plurality of tables;
- a plurality of step-down shelves;
- a plurality of gripper units, wherein each gripper unit of the plurality of gripper units comprises:
  - a clamp comprising:
    - a hinge unit pivotally connected together to two opposing jaws;
    - pads attached to the jaws;
    - a set screw attached to at least one of the jaws; and
    - a rear opening; and
  - a pull unit slidably engageable with the clamp, wherein the pull unit comprises:
    - a pull bar;
    - stabilizer rods; and
    - a coupler slidably engageable with the clamp with the rear opening of the clamp;
- a plurality of claspers;
- a plurality of cutting bars;

14

- a plurality of gripper units;
- a plurality of tension units;
- a frame;
- a hoist assembly; and
- a plurality of dollies.

19. The system of claim 18, wherein the pads comprise a polymeric material selected from at least one of a group consisting of polychloroprene, silicone rubber, isobutylene-isoprene polymer, flexible PVC, natural rubber, low density polyethylene, hydrin rubber, vinylbenzyl chloride styrene-butadiene rubber, chlorobutyl rubber, bromobutyl rubber, bromomethyl styrenebutyl rubber, maleic acid styrene-butadiene rubber, carboxylic acid styrene-butadiene rubber, epoxyisoprene rubber, maleic acid modified natural rubber, maleic acid ethylene propylene rubber and carboxylic acid nitrile-butadiene rubber, butyl rubber, epichlorohydrin rubber, nitrile rubber, hydrogenated nitrile rubber, styrene-butadiene rubber, urethane rubber, fluorinated rubber, silicon rubber, styrene-ethylene-butylene-styrene (SEBS) rubber, ethylene-propylene rubber, ethylene-propylene-diene (EPDM) rubber, butadiene rubber, chlorosulfonated polyethylene (CSPE) synthetic rubber, ethylene vinyl acetate rubber and acryl rubber.

20. The system of claim 18, wherein the each tension unit of the plurality of tension units comprises a pneumatic cylinder tension unit having one input feed line connection.

\* \* \* \* \*